United States Patent
Tsay

(10) Patent No.: US 6,312,284 B1
(45) Date of Patent: Nov. 6, 2001

(54) STRUCTURE FOR A CONNECTOR OF A CIGARETTE LIGHTING DEVICE OF CARS

(76) Inventor: Wen-Feng Tsay, P.O. Box 24-108, Taipei (TW)

( * ) Notice: Subject to any disclaimer, the term of this patent is extended or adjusted under 35 U.S.C. 154(b) by 0 days.

(21) Appl. No.: 09/552,023

(22) Filed: Apr. 19, 2000

(51) Int. Cl.[7] .................................................. H01R 13/60
(52) U.S. Cl. ............................................................. 439/529
(58) Field of Search ..................................... 439/529, 344, 439/350, 352, 662, 664, 665, 668–669; 379/454

(56) References Cited

U.S. PATENT DOCUMENTS

| | | | |
|---|---|---|---|
| 5,131,869 | * | 7/1992 | Wharton ................................ 439/668 |
| 5,158,484 | * | 10/1992 | Chou ..................................... 439/668 |
| 5,201,677 | * | 4/1993 | Takayama ............................. 439/668 |
| 5,626,496 | * | 5/1997 | Hahn .................................... 439/668 |
| 5,839,919 | * | 11/1998 | Chen .................................... 439/529 |
| 5,928,539 | * | 7/1999 | Thivet .................................. 439/668 |

* cited by examiner

Primary Examiner—Paula Bradley
Assistant Examiner—Shanetta D. Ore

(74) Attorney, Agent, or Firm—Dougherty & Troxell

(57) ABSTRACT

In an improved structure for a connector of a cigarette lighting device of cars, a lateral end of an electrically conductive elastic plate projecting slightly from an outer peripheral side of a jack is provided with a vertically depressed slide groove, which is provided with a recessed or bulging oblique face in a suitable position. A rear end of a housing of the jack is provided with annular threads. The slide groove is insertably provided with a push block that matches a bottom side of a groove hole of the slide groove and that is capable of filling a depression of the slide groove. The push block has a flange or recessed groove at a rear end. The threads at the rear end of the housing of the jack threadedly engage a turning nut. The turning nut has a front end provided with a recessed groove or a flange for inter-engagement with the flange or recessed groove of the push block. The housing of the jack is inserted into an insert hole of the cigarette lighting device of a car. By rotating the turning nut, the push block is brought to displace forwardly and rearwardly, with the oblique face guiding the push block to project upwardly to abut against the inner wall of the insert hole to thereby secure the jack and to enhance the load bearing ability and stability of external connections of the connector of the cigarette lighting device. Besides, slippage, improper electrical contact or difficult insertion may be prevented.

1 Claim, 5 Drawing Sheets

STRUCTURE FOR A CONNECTOR OF A CIGARETTE LIGHTING DEVICE OF CARS

BACKGROUND OF THE INVENTION (a) Field of the Invention

The present invention relates to an improved structure for a connector of a cigarette lighting device of cars, more particularly directed to improving load bearing stability of external connections of the connector of the cigarette lighting device of cars and to obviating poor electrical contact. A lateral end of an electrically conductive elastic plate projecting slightly from an outer peripheral side of a jack is provided with a vertically depressed slide groove, which is provided with a recessed or bulging oblique face in a suitable position. A rear end of a housing of the jack is provided with annular threads. The slide groove is insertably provided with a push block that matches a bottom side of a groove hole of the slide groove and that is capable of filling a depression of the slide groove. The push block has a flange or recessed groove at a rear end. The threads at the rear end of the housing of the jack threadedly engage a turning nut. The turning nut has a front end provided with a recessed groove or a flange for inter-engagement with the flange or recessed groove of the push block. The housing of the jack is inserted into an insert hole of the cigarette lighting device of a car. By rotating the turning nut, the push block is brought to displace forwardly and rearwardly, with the oblique face guiding the push block to project upwardly to abut against the inner wall of the insert hole to thereby secure the jack and to enhance the load bearing ability and stability of external connections of the connector of the cigarette lighting device. Besides, slippage, improper electrical contact or difficult insertion may be prevented.

(b) Description of the Prior Art

For connection of electrical circuits, cars are equipped with cigarette lighting devices having circular sockets. For business, travel and information transmission, mobile phones, satellite communication devices, liquid crystal display devices, etc. are very popular. These devices are also turned on when in cars. And cars also provide a source for charging these devices. Besides, most countries have prohibited use of hand-held communication equipment when driving. Therefore, hand-free devices becomes necessary, and cigarette lighting device sockets do not merely permit electrical connection and extend to include article support seats, hand-free charging seats, extension seats, etc. Load bearing has therefore become a function of cigarette lighting device sockets. However, conventional cigarette lighting device sockets are formed by bending metallic electrically conductive electrodes into a suitable shape to be clamped in the socket housing, with the outer edges projecting from the outer end face of the socket housing. Therefore, it is inserted into a circular insert hole of the cigarette lighting device, the internal diameter of the circular insert hole can clamp the metal electrically conductive electrode to cause it to bend down inwardly to achieve a stretching supporting force and to connect to the electrically conductive plate on the hole side to achieve electrical connection. However, since the metallic electrically conductive plate achieves pressing and stretching by virtue of the elasticity and bending ability of the material of the electrode, it is not easy for the conductive plate to provide a pressing force and a strong stretching elastic force at the same time. Besides, due to differences in the bent shape and size as well as the selection of metallic material, oftentimes there is excessive resistance, which prevents easy insertion and removal. Sometimes, breakage even occurs. If the gap between the socket and the insert hole are increased, the connection may easily become loosened when driving on rugged surfaces or at a high speed. There may be unstable signal reception, interrupted signal reception or even damage due to falling of the electrode.

SUMMARY OF THE INVENTION

A primary object of the present invention is to provide an improved structure for a connector of a cigarette lighting device of cars, a lateral end of an electrically conductive elastic plate projecting slightly from an outer peripheral side of a jack is provided with a vertically depressed slide groove, which is provided with a recessed or bulging oblique face in a suitable position. A rear end of a housing of the jack is provided with annular threads. The slide groove is insertably provided with a push block that matches a bottom side of a groove hole of the slide groove and that is capable of filling a depression of the slide groove. The push block has a flange or recessed groove at a rear end. The threads at the rear end of the housing of the jack threadedly engage a turning nut. The turning nut has a front end provided with a recessed groove or a flange for inter-engagement with the flange or recessed groove of the push block. The housing of the jack is inserted into an insert hole of the cigarette lighting device of a car. By rotating the turning nut, the push block is brought to displace forwardly and rearwardly, with the oblique face guiding the push block to project upwardly to abut against the inner wall of the insert hole to thereby secure the jack and to enhance the load bearing ability and stability of external connections of the connector of the cigarette lighting device. Besides, slippage, improper electrical contact or difficult insertion may be prevented.

Another object of the present invention is to provide an improved structure for a connector of a cigarette lighting device of cars, in which prior to insertion of the push block, the turning nut may be turned to cause it to slide along the slide groove to enable the outer peripheral face of the housing of the jack to form a circular tubular shape for easy insertion into the insert hole of the cigarette lighting device to obviate difficult insertion and restrictions posed by selection and design of the material of the metallic electrically conductive electrode.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
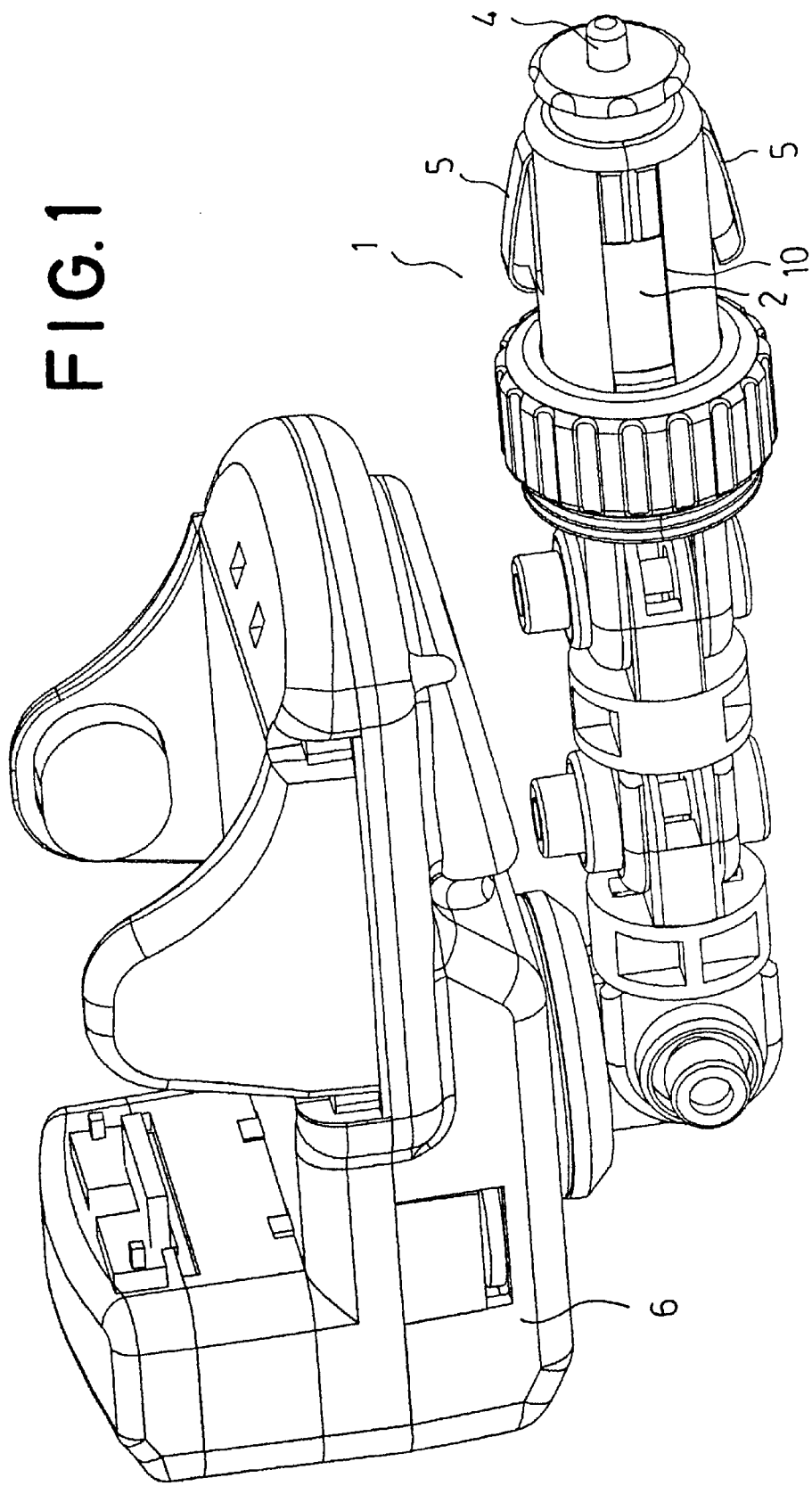
FIG. 1 is a perspective view of a preferred embodiment of the present invention.
Figure 2:
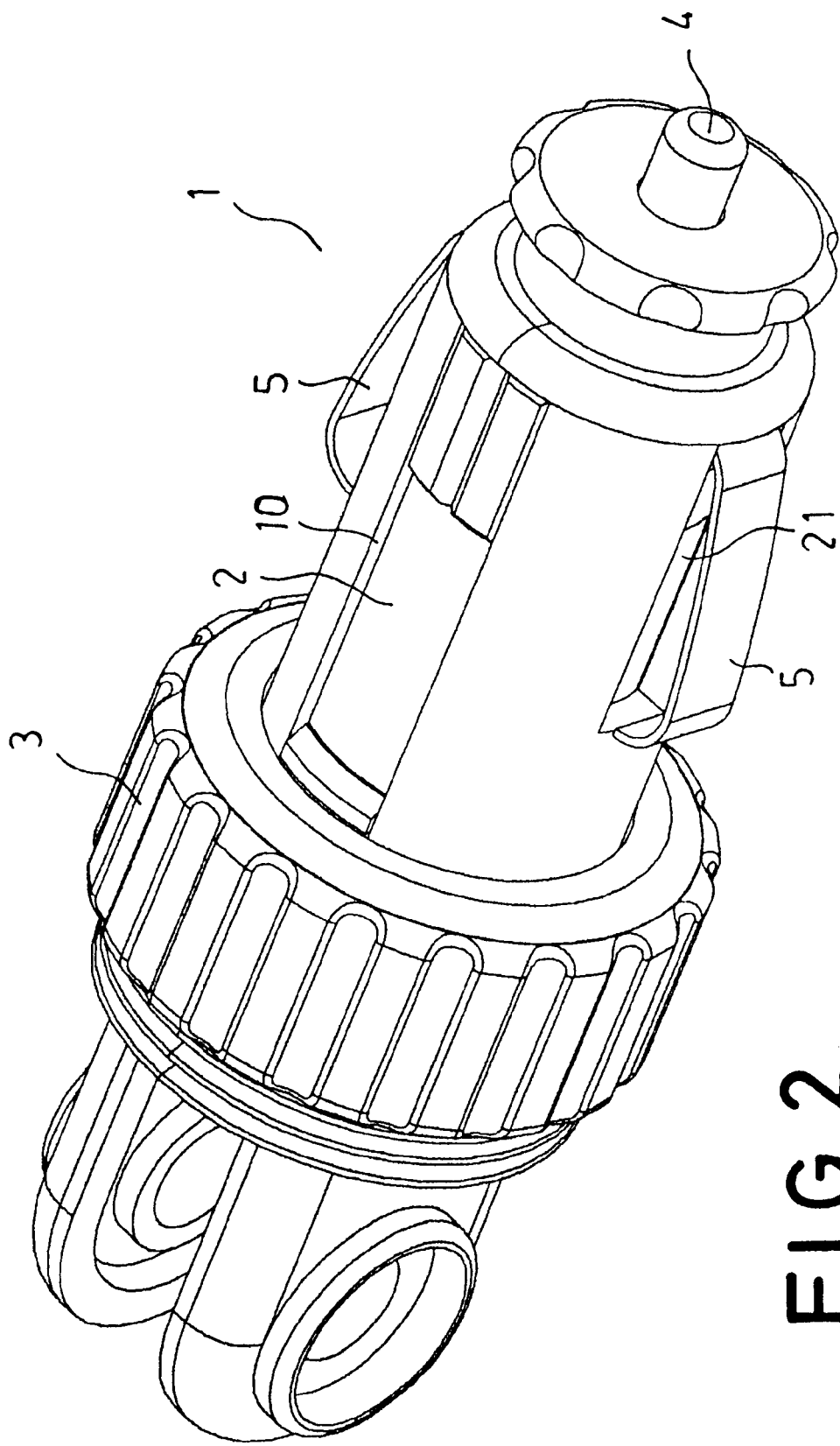
FIG. 2 is a perspective view of the preferred embodiment.
Figure 3:
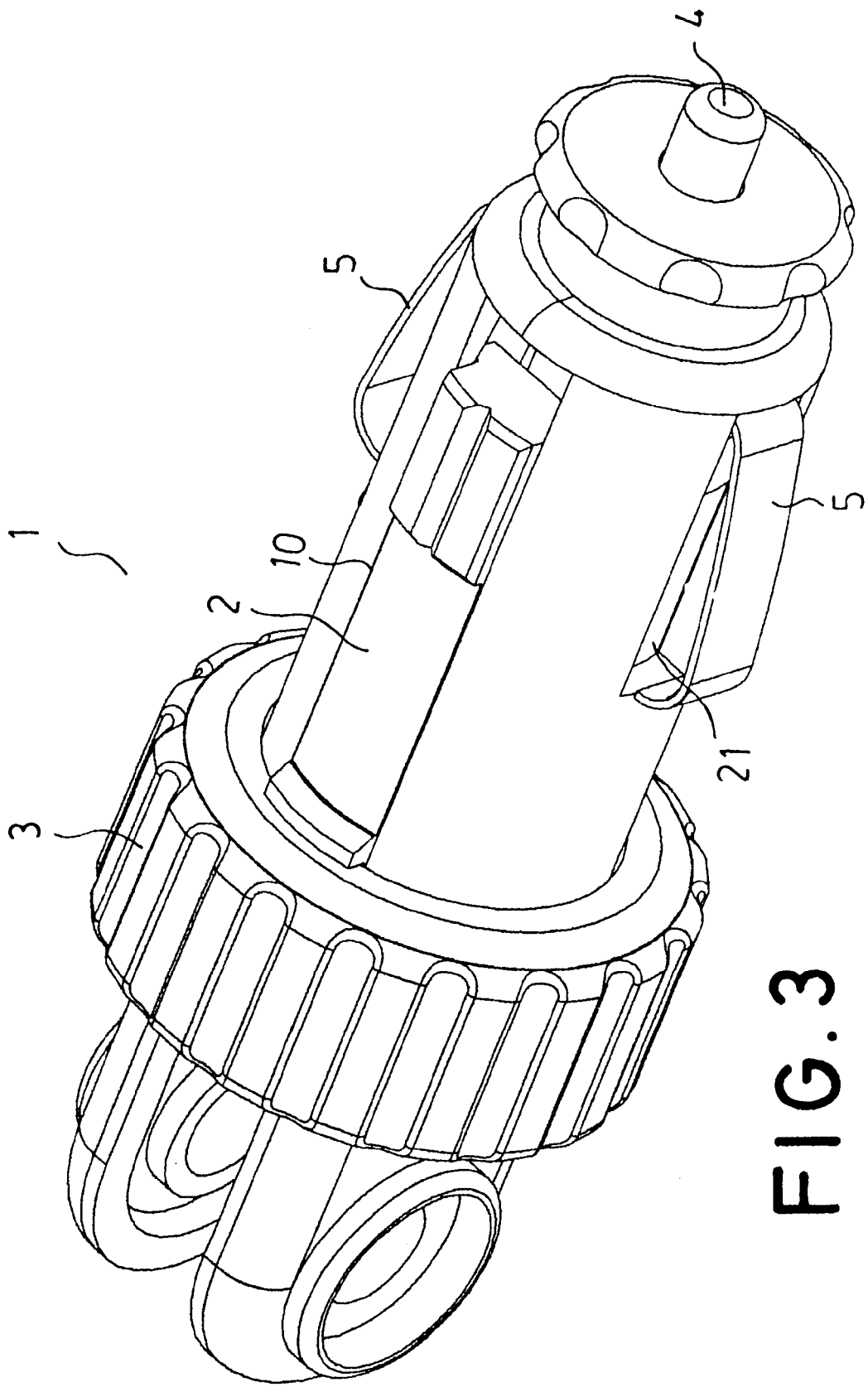
FIG. 3 is a perspective view showing projection of a push block of the preferred embodiment.
Figure 4:
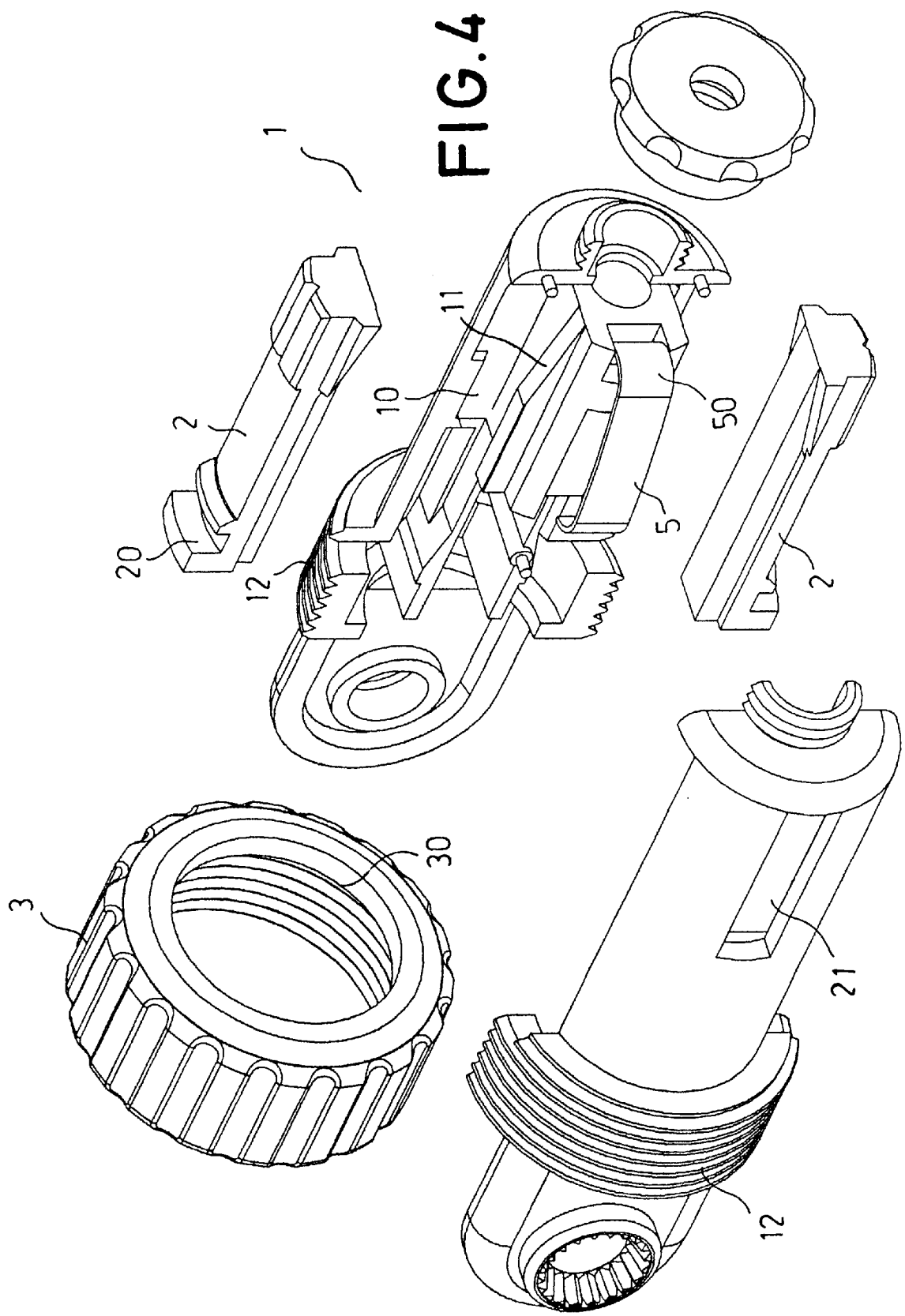
FIG. 4 is an exploded perspective view of the preferred embodiment.
Figure 5:
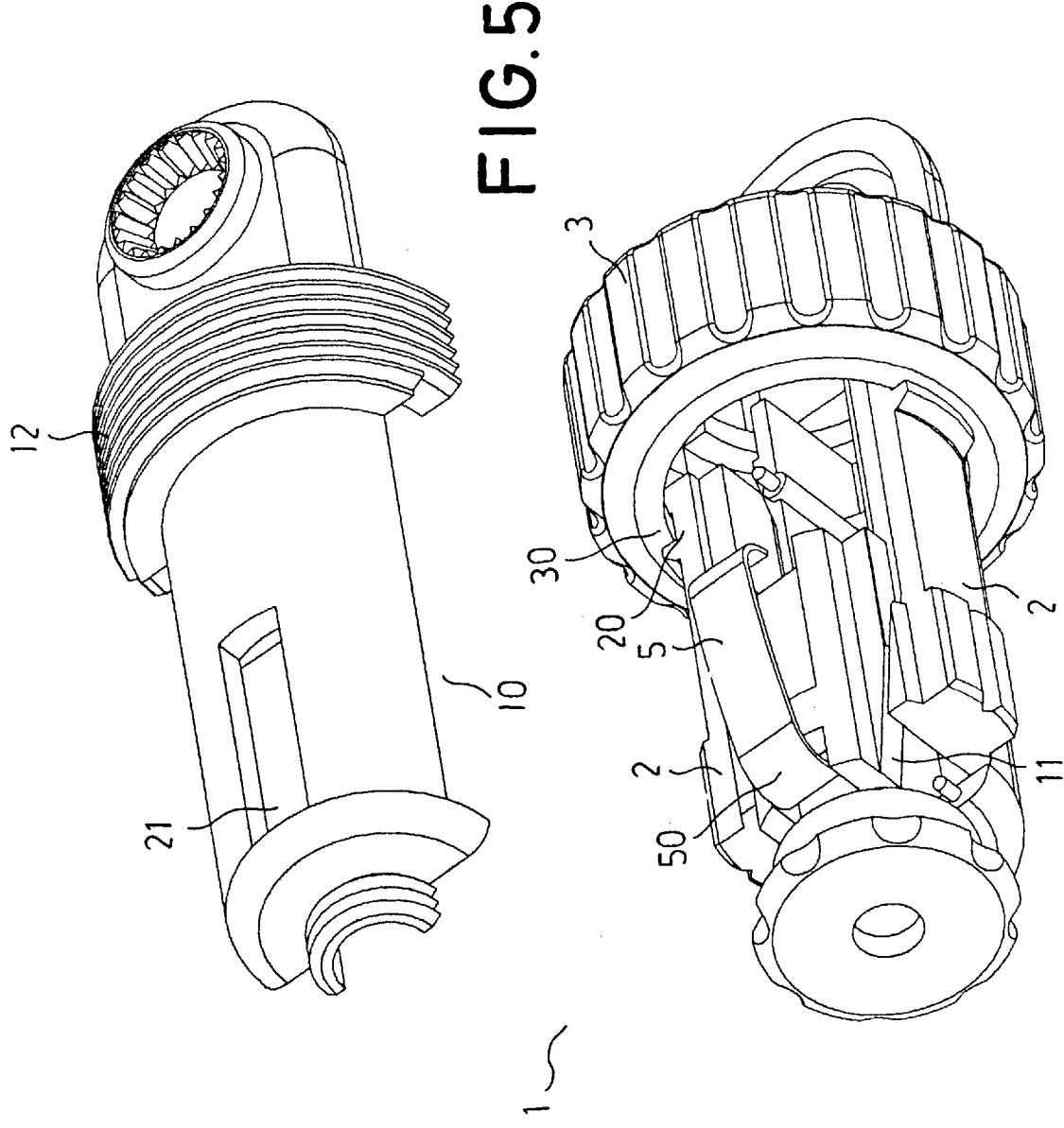
FIG. 5 is a partly exploded perspective view of the preferred embodiment.

With reference to the drawings, the present invention is shown to include a jack 1, a push block 2 and a turning nut 3. The jack 1 is insertable connectable to circular insert hole of the car cigarette lighting device. Like the prior art, a front end thereof has an elastic electrically conductive post 4, and a projecting electrically conductive elastic plate 5 is disposed on one side thereof. The elastic plate 5, with barb 50 at an end portion thereof to serve as a stop, is receivable in a through slot 21 and is prevented from being disengaged from the jack 1, being projecting outwardly slightly only. At a lateral end of the electrically conductive plate on the outer peripheral face of the socket, there is provided a vertically depressed slide groove 10. A recessed or bulging oblique face 11 is formed in a suitable position of the slide groove 10. A rear end of the housing of the jack 1 is further provided with annular threads 12. The slide groove 10 has the push block 2 insertably provided thereon, which matches the shape of the bottom side of a groove hole thereof and is capable of filling the depression of the slide groove 10 to thereby form a circular tubular body with the outer periphery of the housing of the jack 1 for insertion into the insert hole of the cigarette lighting device. A rear end of the push block 2 forms a flange or recessed groove 20. The threads at the rear end of the housing of the jack 1 threadedly engage the turning nut 3. The turning nut 3 utilizes a recessed groove or flange 30 at a front edge thereof to inter-engage with the flange or recessed groove 20 at the rear end of the push block 2. As for the connection of electrical circuits, it is the same as the prior art. One electrode is connected to the elastic plate 5, with the other electrode connected to the electrically conductive post 4. The rear end of the jack 1 may, as shown in FIG. 1, be pivotally connected to a mounting seat 6. The number of slide grooves 10 is not limited to one or two. There may be a plurality of slide grooves 10.

In actual use, the turning nut 3 is firstly adjusted to cause the recessed groove or flange 30 at the front edge to push or pull the flange or recessed groove 20 of the push block, thereby bring the push block 2 to displace forwardly or rearward to overlap the depression of the slide groove 10 of the jack 1 and forms a circular tubular shape with the outer periphery of the housing of the jack 1. In this way, the jack 1 can be inserted into the insert hole of the cigarette lighting device. Since there are no strict requirements for the diameter of the jack 1 and the insert hole as well as the selection of the material and design of the electrically conductive plate 5, it is only necessary to exert a force on the elastic plate 5 during insertion to push the jack 1 into the insert hole of the cigarette lighting device. The turning nut 3 is then turned to thereby cause the push block 2 to displace. When the push block 2 displaces along the slide groove 10 of the jack 1, the bottom edge of the push block will be guided by the recessed or bulging oblique face 11 to project upwardly to gradually come into contact with the inner face of the insert hole and to push the inner face of the insert hole for better securing effect, whereby the load bearing ability and stability of the mounting seat 6 connected externally to insert hole of the cigarette lighting device of cars may be increased. Besides, the jack 1 may be prevented from slippage or poor electrical contact. Besides, it is very convenient to insert the jack 1. When it is desired to disengage the jack 1, the same process is repeated in a reverse order.

Although the present invention has been illustrated and described with reference to the preferred embodiment thereof, it should be understood that it is in no way limited to the details of such embodiment but is capable of numerous modifications within the scope of the appended claims.

What is claimed is:

1. A connector of a cigarette lighting device of cars, comprising: a jack insertable into a circular insert hole of the cigarette lighting device, the jack having an elastic electrically conductive post at a front end and an electrically conductive elastic plate projecting from a side to electrically connect to the cigarette lighting device, wherein an outer peripheral side of said jack has slide groove depression, said slide groove depression having an oblique face, a rear end of said jack being provided with annular threads; a push block slidably inserted in said slide groove depression, the push block having an oblique bottom matching the oblique face of said slide groove depression, said push block also having a flange and recessed groove at a rear end; and, a turning nut engaging said threads of said jack, said turning nut having a front end engaging said flange and recessed groove of said push block, wherein said rear end of said jack is pivotally connected to a mounting seat.

* * * * *